United States Patent
Kato (10) Patent No.: US 11,287,190 B2
(45) Date of Patent: Mar. 29, 2022

(54) SPIRAL HEAT EXCHANGER

(71) Applicant: SUBARU CORPORATION, Tokyo (JP)

(72) Inventor: Wataru Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 16/738,843

(22) Filed: Jan. 9, 2020

(65) Prior Publication Data
US 2020/0300552 A1    Sep. 24, 2020

(30) Foreign Application Priority Data
Mar. 20, 2019    (JP) .............................. JP2019-053120

(51) Int. Cl.
*F28D 9/04* (2006.01)
*F28D 9/00* (2006.01)
*F01N 5/02* (2006.01)

(52) U.S. Cl.
CPC ............. *F28D 9/04* (2013.01); *F28D 9/0081* (2013.01); *F01N 5/02* (2013.01)

(58) Field of Classification Search
CPC ........ F28D 9/04; F28D 2021/008; F28D 7/04; F28F 2225/02; F28F 2225/04; F28F 2265/32
See application file for complete search history.

(56) References Cited

U.S. PATENT DOCUMENTS 2,060,440 A * 11/1936 Curt .......................... F28D 9/04
                                                        165/146
2,663,549 A * 12/1953 Otten ........................ F28D 9/04
                                                        165/163

(Continued)

FOREIGN PATENT DOCUMENTS

DE    202016003318 U1 *  6/2016 .............. F28F 9/027
DE    102016216430 A1 *  3/2018 ........... F28D 7/0091

(Continued)

OTHER PUBLICATIONS

FR-2811068—Machine English translation (Year: 2002).*

(Continued)

*Primary Examiner* — Paul Alvare
*Assistant Examiner* — Jose O Glass-Quinones
(74) *Attorney, Agent, or Firm* — McGinn I.P. Law Group, PLLC.

(57) ABSTRACT

A spiral heat exchanger includes a spiral unit, a case member, and a bracket. The spiral unit includes thin metal plates. The thin metal plates are spaced away from each other and spirally wound. The thin metal plates define flow paths. A portion or all of the flow paths are provided with a coolant flowing therein. The case member is attached to a vehicle and contains the spiral unit. The bracket is fixed to the case member and holds the spiral unit. The bracket includes a holding portion and a fixed portion. The holding portion holds a first end, a second end, or both of the spiral unit in an axial direction. The fixed portion is disposed between an outer peripheral surface of the spiral unit and an inner peripheral surface of the case member. The fixed portion is fixed to the inner peripheral surface of the case member.

20 Claims, 3 Drawing Sheets

(56) References Cited

U.S. PATENT DOCUMENTS

| | | | | | |
|---|---|---|---|---|---|
| 5,323,608 | A * | 6/1994 | Honma | ............... | F01N 3/281 422/180 |
| 5,505,255 | A * | 4/1996 | Viessmann | ............ | F24H 1/282 165/163 |
| 5,866,077 | A * | 2/1999 | Sakurai | ............... | F01N 3/281 422/174 |
| 7,159,643 | B2 * | 1/2007 | Kudo | ............... | F28D 20/021 165/10 |
| 2004/0197090 | A1 * | 10/2004 | Kudo | ............... | F24H 7/0408 392/341 |
| 2004/0251011 | A1 * | 12/2004 | Kudo | ............... | F28D 20/021 165/172 |
| 2008/0073064 | A1 * | 3/2008 | Gueguen | ............... | F28D 9/04 165/95 |
| 2008/0274020 | A1 * | 11/2008 | Matsuoka | ............ | B01D 39/12 422/180 |
| 2012/0132407 | A1 * | 5/2012 | Makhlouf | ............ | F28D 9/0025 165/173 |
| 2013/0118722 | A1 * | 5/2013 | Greber | ............... | B23P 15/26 165/165 |
| 2014/0318748 | A1 * | 10/2014 | Svensson | ............ | C09D 5/1675 165/133 |
| 2015/0322841 | A1 * | 11/2015 | Greber | ............... | B23P 15/26 60/618 |
| 2015/0323260 | A1 * | 11/2015 | Greber | ............... | F28D 9/04 165/164 |
| 2017/0248050 | A1 * | 8/2017 | Ohrem | ............... | F01N 3/02 |

FOREIGN PATENT DOCUMENTS

| | | | | |
|---|---|---|---|---|
| EP | 2423630 | A1 * | 2/2012 | ............... F28F 3/12 |
| FR | 2811068 | A1 * | 1/2002 | ............. F25B 47/00 |
| JP | 2001-099491 | | 4/2001 | |
| WO | WO-2018198781 | A1 * | 11/2018 | ............... F28D 7/10 |

OTHER PUBLICATIONS

DE-202016003318—Machine English translation (Year: 2016).*
WO-2018198781—English abstract (Year: 2018).*
EP-2423630—Machine English translation (Year: 2012).*
DE-102016216430—Machine English translation (Year: 2018).*

* cited by examiner

SPIRAL HEAT EXCHANGER

CROSS-REFERENCE TO RELATED APPLICATIONS

The present application claims priority from Japanese Patent Application No. 2019-053120 filed on Mar. 20, 2019, the entire contents of which are hereby incorporated by reference.

BACKGROUND

The technology relates to a spiral heat exchanger.

In a facility such as a factory, various heat exchangers have been used, for example, in order to cool a fluid or for any other purpose. For example, as disclosed in Japanese Unexamined Patent Application Publication No. 2001-099491, one type of the heat exchanger includes two or more metal plates and a spiral unit. The metal plates are spaced away from each other and are spirally wound. The spiral unit has two or more flow paths defined by the metal plates. Such a heat exchanger is also referred to as a spiral heat exchanger, and has an advantage of its compact size compared to other types of heat exchangers.

SUMMARY

An aspect of the technology provides a spiral heat exchanger that includes a spiral unit, a case member, and a bracket. The spiral unit includes two or more thin metal plates. The thin metal plates are spaced away from each other and spirally wound. The thin metal plates define two or more flow paths. A portion or all of the flow paths are provided with a coolant flowing in the corresponding portion or all of the flow paths. The case member is attached to a vehicle and contains the spiral unit. The bracket is fixed to the case member and holds the spiral unit. The bracket includes a holding portion and a fixed portion. The holding portion holds a first end, a second end, or both of the spiral unit in an axial direction of the spiral unit. The fixed portion is disposed between an outer peripheral surface of the spiral unit and an inner peripheral surface of the case member. The fixed portion is fixed to the inner peripheral surface of the case member.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In a case of applying a spiral heat exchanger to a vehicle, it can be considered to reduce a thickness of a metal plate in a spiral unit compared to that in an existing spiral heat exchanger used in a facility such as a factory, in order to reduce a weight of the vehicle. Providing the spiral unit including such a thin metal plate, i.e., a metal plate having a thickness smaller than that in the existing spiral heat exchanger, can make it easier for the spiral unit to be damaged, for example, when the spiral unit is hit by an object such as a stone on a road while the vehicle is traveling on the road. In order to suppress damaging of the spiral unit, it can be considered to contain the spiral unit in a case member attached to the vehicle. It is, however, difficult to contain the spiral unit in the case member in a state of being kept in a desired shape since the spirally-wound thin metal plate is easily deformed to an original state before being wounded, i.e., spring back easily occurs. A technique is therefore desired that makes it possible to appropriately attach a spiral heat exchanger to a vehicle while reducing a weight of the vehicle.

It is desirable to provide a new and improved spiral heat exchanger that is appropriately attachable to a vehicle while allowing a weight of the vehicle to be reduced.

In the following, some example embodiments of the technology are described with reference to the accompanying drawings. Note that the following description is directed to illustrative examples of the disclosure and not to be construed as limiting the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

A description is given below referring to an example where a spiral heat exchanger is mounted on a vehicle in order to cool an exhaust gas from a turbine engine; however, a spiral heat exchanger according to one embodiment of the technology may be mounted on a vehicle for any other application such as cooling of an exhaust gas from a gasoline engine. Further, a vehicle 1 is described below as an example of a vehicle on which the spiral heat exchanger is to be mounted; however, a configuration of the vehicle on which the spiral heat exchanger is to be mounted is not particularly limited to the example below, as will be described later.

Herein, a traveling direction of a vehicle is referred to as a front direction, and a direction opposite to the traveling direction of the vehicle is referred to as a rear direction. A direction toward the left with respect to the traveling direction is referred to as a left direction, and a direction toward the right with respect to the traveling direction is referred to as a right direction. A vertically-upward direction with respect to the traveling direction is referred to as an upper direction, and a vertically-downward direction with respect to the traveling direction is referred to as a lower direction.

1. Outline of Vehicle

Figure 1:
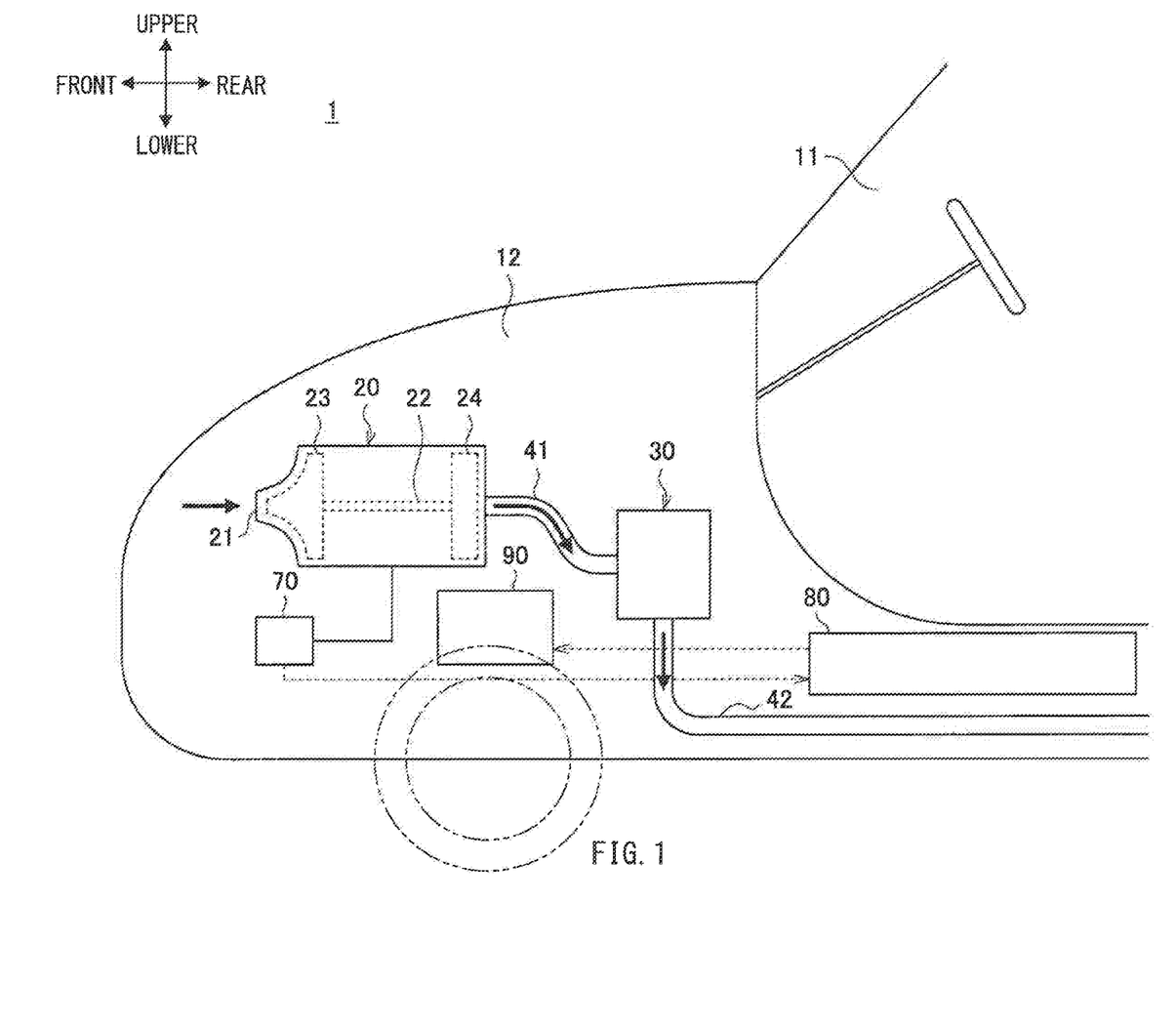
FIG. 1 is a schematic diagram illustrating an example of an outline configuration of a vehicle on which a spiral heat exchanger according to one example embodiment of the technology is to be mounted.

Referring to FIG. 1, a description is given first of an outline of the vehicle 1 on which a spiral heat exchanger 30 according to one example embodiment of the technology is to be mounted.

FIG. 1 schematically illustrates an outline configuration of the vehicle 1. In FIG. 1, a thick arrow schematically illustrates a flow of air taken into a turbine engine 20 and a flow of a gas exhausted from the turbine engine 20.

As illustrated in FIG. 1, the vehicle 1 may include, for example but not limited to, the turbine engine 20, the spiral heat exchanger 30, an electric power generator 70, a battery 80, and a driving motor 90.

The vehicle 1 may be configured to travel with the use of the driving motor 90 as a driving source. Electric power to be supplied to the driving motor 90 may be stored in the battery 80. The vehicle 1 may be configured to drive the electric power generator 70 with the use of motive power outputted from the turbine engine 20 and charge the battery 80 with the use of electric power generated by the electric power generator 70. This increases a traveling range of the vehicle 1. In a non-limiting example, the turbine engine 20, the spiral heat exchanger 30, the electric power generator 70, and the driving motor 90 may be disposed inside an engine compartment 12, and the battery 80 may be disposed below a vehicle compartment 11.

The electric power generator 70 may be coupled to a rotating shaft of the turbine engine 20 with a member such as a gear or a chain in between, for example. This allows motive power outputted from the turbine engine 20 to be inputted to the electric power generator 70 via the member such as the gear or the chain.

The battery 80 may include, for example but not limited to, a secondary battery such as a lithium-ion battery, a lithium-ion polymer battery, a nickel-metal hydride battery, a nickel-cadmium battery, or a lead-acid battery.

The driving motor 90 may include, for example but not limited to, a polyphase motor such as a three-phase motor. The driving motor 90 may be coupled to the battery 80 with an unillustrated inverter in between, and may generate motive power with the use of the electric power stored in the battery 80.

The turbine engine 20 may be an internal combustion engine in which a high-temperature and high-voltage gas generated as a result of combustion so drives a turbine 24 that the turbine 24 rotates to generate rotational energy.

In a specific but non-limiting example, a front end of the turbine engine 20 may be provided with an air inlet 21. The turbine engine 20 may include a compressor 23 and the turbine 24 inside the turbine engine 20. The compressor 23 and the turbine 24 may be coupled to each other with a rotating shaft 22 in between. The rotating shaft 22 may extend in a front-rear direction. The compressor 23 may be fixed to front side of the rotating shaft 22 and the turbine 24 may be fixed to rear side of the rotating shaft 22.

In the turbine engine 20 described above, outside air may be taken in from the air inlet 21 and compressed by the compressor 23. The air thus having a high voltage and a fuel supplied from an unillustrated fuel inlet may be mixed with each other to combust, thereby generating a high-pressure and high-voltage gas. The turbine 24 may be driven to rotate by the high-pressure and high-voltage gas thus generated.

A rear end of the turbine engine 20 may be coupled to an exhaust pipe 41. The gas that has passed through the turbine 24 may be sent to the exhaust pipe 41. The exhaust pipe 41 may be coupled to the spiral heat exchanger 30. The high-temperature gas exhausted from the turbine engine 20 may therefore pass through the exhaust pipe 41 to be sent to the spiral heat exchanger 30.

The spiral heat exchanger 30 may be provided to cool the high-temperature gas exhausted from the turbine engine 20 by means of heat exchange. The spiral heat exchanger 30 may be coupled to an exhaust pipe 42. The gas cooled by the spiral heat exchanger 30 by means of heat exchange may be sent to the exhaust pipe 42. The gas exhausted from the spiral heat exchanger 30 may pass through the exhaust pipe 42 to be discharged to outside of the vehicle 1.

A structure of the spiral heat exchanger 30 in the vehicle 1 may be devised to achieve appropriate attachment of the spiral heat exchanger 30 to the vehicle 1. Details of such a spiral heat exchanger 30 will be described later.

2. Details of Spiral Heat Exchanger

Figure 2:
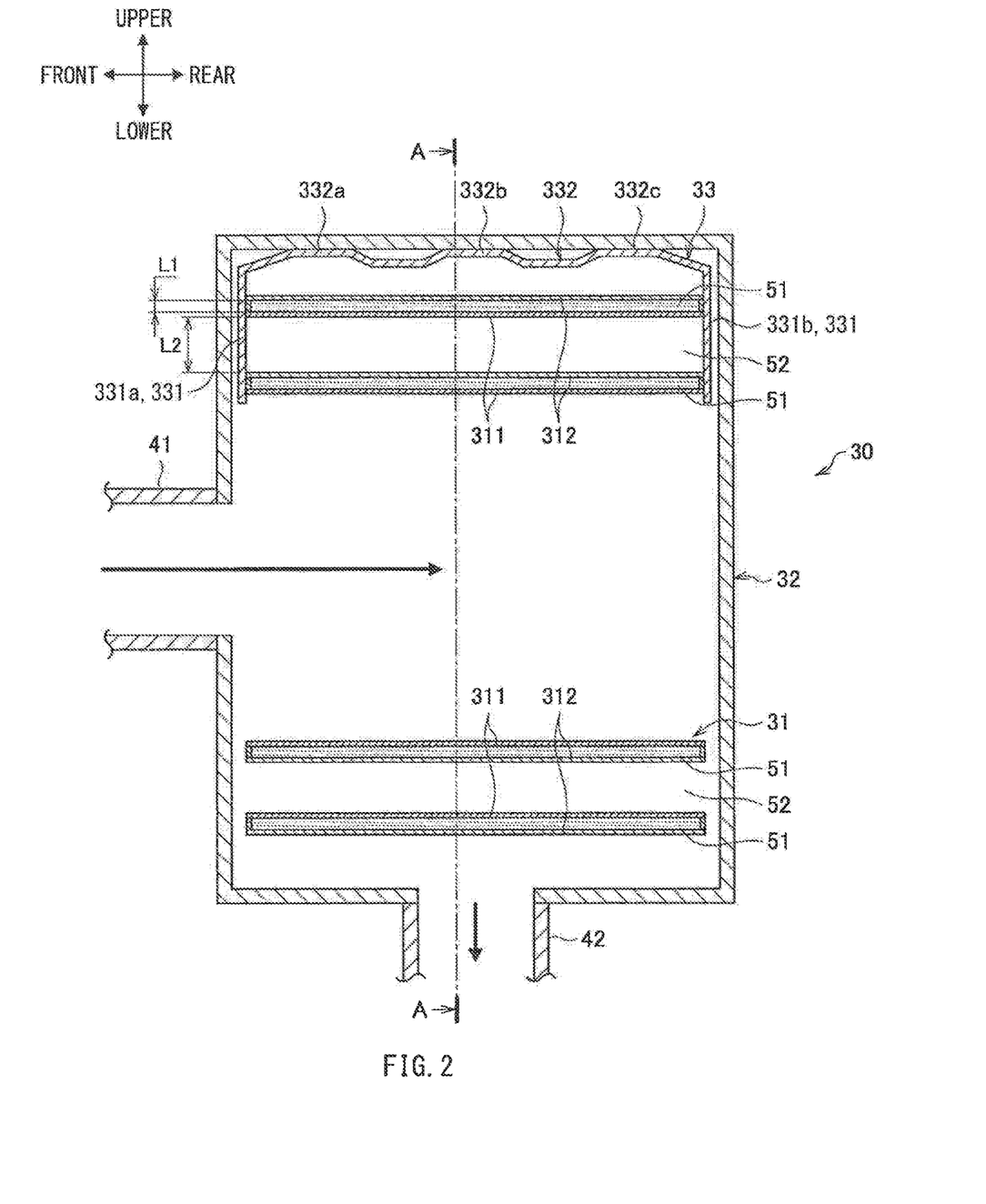
FIG. 2 is a side cross-sectional view of an example of the spiral heat exchanger according to the example embodiment.
Figure 3:
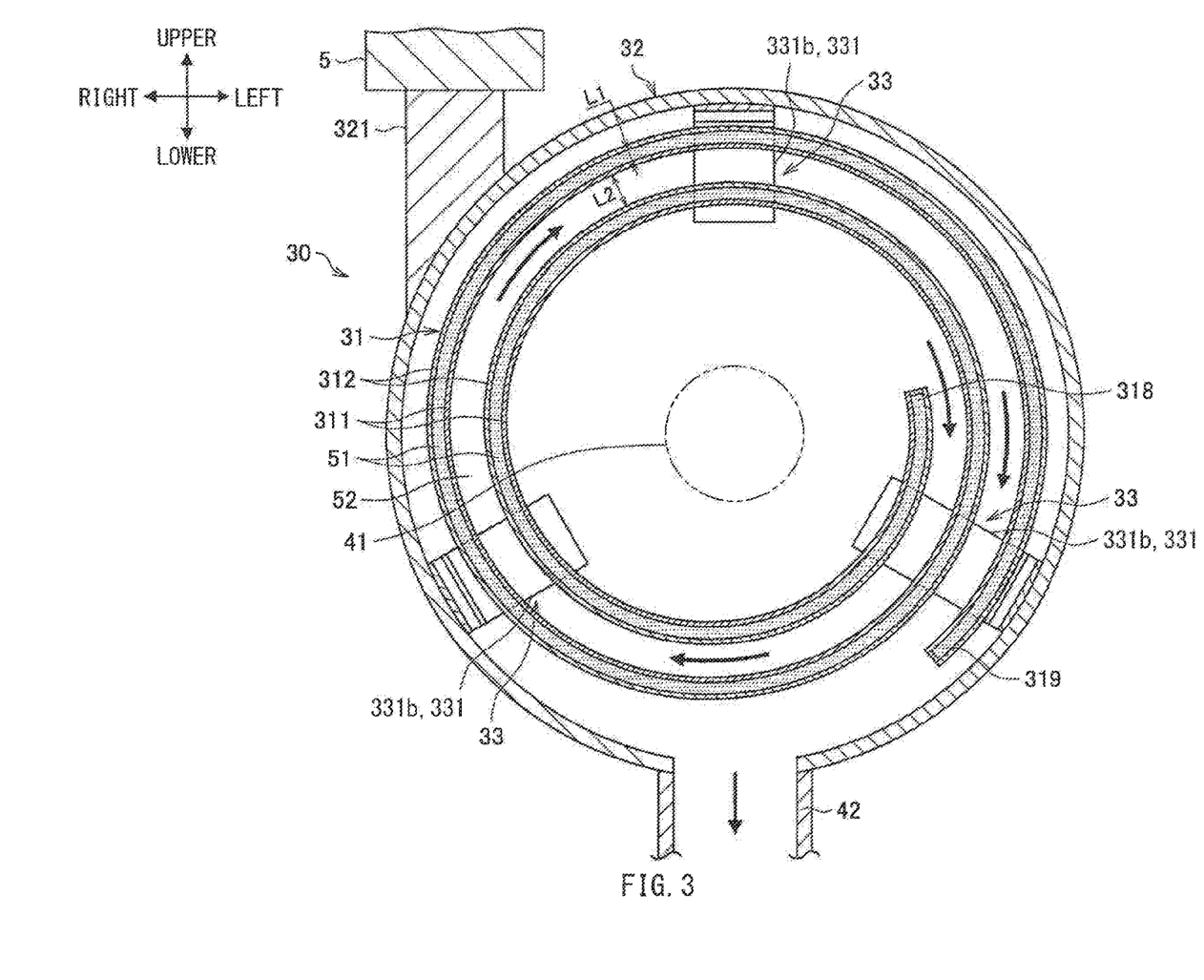
FIG. 3 is a front cross-sectional view of an example of the spiral heat exchanger according to the example embodiment.

Referring to FIGS. 2 and 3, a description is given next of the details of the spiral heat exchanger 30 according to the example embodiment of the technology.

FIG. 2 is a side cross-sectional view of the spiral heat exchanger 30. FIG. 3 is a front cross-sectional view of the spiral heat exchanger 30, specifically, a cross-sectional view taken along a line A-A in FIG. 2 that passes through the exhaust pipe 42.

As illustrated in FIGS. 2 and 3, the spiral heat exchanger 30 includes a spiral unit 31, a case member 32, and a bracket 33.

In the spiral heat exchanger 30, the case member 32 is attached to the vehicle 1. The spiral unit 31 is contained in the case member 32. The spiral unit 31 may be attached to the case member 32 with the bracket 33 in between.

The spiral unit 31 may achieve heat exchange between fluids.

The spiral unit 31 includes two or more thin metal plates that are spaced away from each other and are spirally wound. In a specific but non-limiting example, the thin metal plates may have a volute shape with a curved line curving outward from the center when viewed from a direction of a central axis. The thin metal plates define two or more flow paths. A coolant flows in a portion or all of the flow paths.

FIGS. 2 and 3 illustrate an example in which an axial direction of the spiral unit 31 coincide with the front-rear direction; however, a posture of the spiral unit 31 in the spiral heat exchanger 30 is not particularly limited to this example. A material included in the thin metal plates included in the spiral unit 31 is not particularly limited; however, the thin metal plates may each include a material such as stainless steel or aluminum, for example.

In a specific but non-limiting example, the thin metal plates included in the spiral unit 31 may each have a thickness within a range from 0.4 mm to 2.0 mm both inclusive. In contrast, a general metal plate included in a spiral unit of a spiral heat exchanger to be used in a facility such as a factory has a thickness greater than 2.0 mm. In other words, the thin metal plates included in the spiral unit 31 of the spiral heat exchanger 30 may each correspond to a metal plate having a thickness smaller than that of the metal plate included in the spiral unit of the existing spiral heat exchanger. As described above, a spiral heat exchanger generally has an advantage of its compact size compared to any other type of heat exchanger. Therefore, application of the spiral heat exchanger 30 to the vehicle 1 as its heat exchanger helps reduction in weight of the vehicle 1. Further, the use of the thin metal plates having the thickness smaller than that of the metal plates included in the spiral unit of the existing heat exchanger as the metal plates included in the spiral unit 31 of the spiral heat exchanger 30 allows for more effective reduction in weight of the vehicle 1.

As illustrated in FIGS. 2 and 3, in more detail, the spiral unit 31 may include two thin metal plates, i.e., a thin metal plate 311 and a thin metal plate 312. The thin metal plate 311 and the thin metal plate 312 are spaced away from each other and are spirally wound. In the spiral unit 31, the thin metal plate 311 of the two thin metal plates may be positioned on inner side compared to the thin metal plate 312.

In the spiral unit 31, the thin metal plate 311 and the thin metal plate 312 may be spirally would to provide two or more layers of thin metal plates in a radial direction of the spiral unit 31. In an example illustrated in FIG. 3, the spiral unit 31 basically has four layers of thin metal plates; however, the spiral unit 31 also has a portion with six layers of thin metal plates. Specifically, the spiral unit 31 has six layers of thin metal plates in a lower-left portion thereof in the example illustrated in FIG. 3. It is to be noted that the number of layers of thin metal plates in the spiral unit 31 is not particularly limited to that in the example illustrated in FIG. 3.

In a process of manufacturing the spiral unit 31, first, the thin metal plate 311 having a band-like shape and the thin metal plate 312 having a band-like shape may be overlaid on each other. Thereafter, the thin metal plate 311 and the thin metal plate 312 overlaid on each other may be subjected to a bending process that causes the thin metal plate 311 and the thin metal plate 312 to be spirally wound around an axis extending in a width direction of the thin metal plate 311 and the thin metal plate 312. As described above, the spiral unit 31 of the spiral heat exchanger 30 may include the thin metal plate 311 and the thin metal plate 312 that each have a thickness smaller than that of the metal plates included in the spiral unit of the existing spiral heat exchanger. Therefore, it is easier for the thin metal plate 311 and the thin metal plate 312 spirally wound to return to an original state before being spirally wound. As will be described later, a first end, a second end, or both of the spiral unit 31 of the spiral heat exchanger 30 in the axial direction of the spiral unit 31 are contained in the case member 32 while being held by the bracket 33. This makes it possible to keep the spiral unit 31, contained in the case member 32, in a desired shape.

In the spiral unit 31, the thin metal plate 311 and the thin metal plate 312 that are spaced away from each other and spirally wound define two flow paths, i.e., a flow path 51 and a flow path 52. The flow path 51 may be a space between an outer peripheral surface of the thin metal plate 311 and an inner peripheral surface of the thin metal plate 312. In the flow path 51, a coolant may flow. The flow path 52 may be a space between an outer peripheral surface of the thin metal plate 312 and an inner peripheral surface of the thin metal plate 311. In the flow path 52, a high-temperature gas that is exhausted from the turbine engine 20 and sent to the flow path 52 via the exhaust pipe 42 may flow. In the example illustrated in FIGS. 2 and 3, a width L2 of the flow path 52 may be greater than a width L1 of the flow path 51. The width L2 may be a length of the flow path 52 in the radial direction of the spiral unit 31. The width L1 may be a length of the flow path 51 in the radial direction of the spiral unit 31.

As illustrated in FIG. 3, the thin metal plate 311 and the thin metal plate 312 may be coupled to each other at an end 318 and an end 319 in a circumferential direction of the spiral unit 31. A gap between the outer peripheral surface of the thin metal plate 311 and the inner peripheral surface of the thin metal plate 312 may be thus closed in an entire region from a front end of the spiral unit 31 to a rear end of the spiral unit 31. It is to be noted that the end 318 may correspond to an inner end of the two ends in the circumferential direction of the spiral unit 31, and the end 319 may correspond to an outer end of the two ends in the circumferential direction of the spiral unit 31. Further, as illustrated in FIG. 2, the thin metal plate 311 and the thin metal plate 312 may be coupled to each other at the front end and the rear end of the spiral unit 31. A gap between the outer peripheral surface of the thin metal plate 311 and the inner peripheral surface of the thin metal plate 312 may be thus closed in an entire region from the end 318 to the end 319 in the circumferential direction of the spiral unit 31. The flow path 51 in which the coolant flows may be therefore sealed. In more detail, a circuit path in which the coolant circuits may be coupled to the flow path 51 described above, which causes the coolant circuiting in the circuit path to be continuously supplied into the flow path 51.

The case member 32 is attached to the vehicle 1 and contains the spiral unit 31.

A material of a thin metal plate of the case member 32 is not particularly limited; however, the thin metal plate included in the case member 32 may include a material such as stainless steel or aluminum, for example.

As illustrated in FIGS. 2 and 3, in more detail, the case member 32 may have an almost cylindrical shape. The spiral unit 31 may be so contained inside the case member 32 that an axial direction of the case member 32 coincides with the axial direction of the spiral unit 31. In other words, in the example illustrated in FIGS. 2 and 3, the axial direction of the case member 32 may coincide with the front-rear direction.

As illustrated in FIG. 3, an outer peripheral portion of the case member 32 may be provided with an attachment portion 321 directed to attachment of the case member 32 to the vehicle 1. The attachment portion 321 may extend outward from the outer peripheral portion of the case member 32. A tip of the attachment portion 321 may be fixed to a frame member 5 of the vehicle 1, for example, by means of screw fastening or any other method. The case member 32 may be thereby attached to the vehicle 1. It is to be noted that a shape of the frame member 5 and a position of the frame member 5 in the vehicle 1 are not particularly limited.

The exhaust pipe 41 through which the gas exhausted from the turbine engine 20 passes may be coupled to a middle portion of the front end of the case member 32. The exhaust pipe 42 into which the gas subjected to heat exchange to be cooled by the spiral heat exchanger 30 is sent may be coupled to the outer peripheral portion of the case member 32. In a specific but non-limiting example illustrated in FIGS. 2 and 3, the exhaust pipe 42 may be coupled to a lower portion of the outer peripheral portion of the case member 32.

The bracket 33 is fixed to the case member 32, and holds the spiral unit 31. The bracket 33 may be a member directed to attachment of the spiral unit 31 to the case member 32.

The bracket 33 includes a holding portion 331 and a fixed portion 332. The holding portion 331 holds a front end, a rear end, or both of the spiral unit 31 in the axial direction of the spiral unit 31. The fixed portion 332 is disposed between an outer peripheral surface of the spiral unit 31 and an inner peripheral surface of the case member 32 and is fixed to the inner peripheral surface of the case member 32. In this example, the outer peripheral surface of the spiral unit 31 described above may refer to an outer peripheral surface of a portion corresponding to the outermost layer of the layers of the thin metal plates in the spiral unit 31.

A material included in the bracket 33 is not particularly limited; however, the bracket 33 may include a material such as stainless steel or aluminum, for example.

As illustrated in FIG. 3, two or more brackets 33 may be so disposed as to be spaced away from each other in the circumferential direction of the spiral unit 31 in the spiral heat exchanger 30. FIG. 3 illustrates an example where three brackets 33 are disposed with the same spacing in between in the circumferential direction of the spiral unit 31; however, the number and the positions of the brackets 33 in the spiral heat exchanger 30 are not particularly limited to those in the example illustrated in FIG. 3. In one example embodiment, two or more brackets 33 may be so disposed as to be spaced away from each other in the circumferential direction of the spiral unit 31 as described above, in view of more appropriately holding the spiral unit 31 to thereby keep the spiral unit 31 in the desired shape.

As illustrated in FIG. 2, in more detail, the fixed portion 332 may extend in the axial direction of the spiral unit 31 from first side to second side of the spiral unit 31 in the axial direction. In a specific but non-limiting example, the fixed portion 332 may extend in the front-rear direction of the vehicle 1 from the front side of the vehicle 1 to the rear side of the vehicle 1. As will be described later, the holding portion 331 may be coupled to each of the front end and the rear end of the fixed portion 332. In a specific but non-limiting example, the front end of the fixed portion 332 may be coupled to a first holding portion 331a and the rear end of the fixed portion 332 may be coupled to a second holding portion 331b.

The fixed portion 332 may be fixed to the inner peripheral surface of the case member 32, for example, by welding. In the non-limiting example illustrated in FIG. 2, a front portion 332a, a middle portion 332b, and a rear portion 332c of the fixed portion 332 may be in contact with the inner peripheral surface of the case member 32 and may be welded to the inner peripheral surface of the case member 32.

It is to be noted that the fixed portion 332 may be fixed to the inner peripheral surface of the case member 32 by any method other than welding. In the non-limiting example illustrated in FIG. 2, the three portions of the fixed portion 332 spaced away from each other may be fixed to the inner peripheral surface of the case member 32; however, it is sufficient that at least one portion of the fixed portion 332 is fixed to the inner peripheral surface of the case member 32. In one example, the entire region of the fixed portion 332 in the front-rear direction may be fixed to the inner peripheral surface of the case member 32.

In view of appropriately protecting the spiral unit 31 from an impact applied to the case member 32 from outside, the fixed portion 332 may be spaced away from the outer peripheral surface of the spiral unit 31 in one example embodiment, as illustrated in FIG. 2. The above-described impact may be caused by an object such as a stone coming into contact with the case member 32, for example. In a specific but non-limiting example, the entire region of the fixed portion 332 in the front-rear direction may be spaced away from the outer peripheral surface of the spiral unit 31.

As illustrated in FIG. 2, in more detail, the holding portion 331 may include a first holding portion 331a and a second holding portion 331b. The first holding portion 331a may hold the front end of the spiral unit 31. The second holding portion 331b may hold the rear end of the spiral unit 31.

The first holding portion 331a may extend from a front end of the fixed portion 332 toward inner side of the case member 32. The front end of the spiral unit 31 may be fixed to a rear surface of the first holding portion 331a, for example, by welding. The front end of the spiral unit 31 may be thereby held by the first holding portion 331a.

The second holding portion 331b may extend from a rear end of the fixed portion 332 toward the inner side of the case member 32. The rear end of the spiral unit 31 may be fixed to a front surface of the second holding portion 331b, for example, by welding. The rear end of the spiral unit 31 may be thereby held by the second holding portion 331b.

In view of more appropriately holding the spiral unit 31 to keep the spiral unit 31 in the desired shape, the first holding portion 331a and the second holding portion 331b may hold each of the layers of the thin metal plate 311 and the thin metal plate 312 of the spiral unit 31, as illustrated in FIGS. 2 and 3, in one example embodiment.

In a specific but non-limiting example, the first holding portion 331a may extend from the front end of the fixed portion 332 to inner side of a portion corresponding to the innermost layer of the thin metal plates in the spiral unit 31, and the second holding portion 331b may extend from the rear end of the fixed portion 332 to the inner side of the portion corresponding to the innermost layer of the thin metal plates in the spiral unit 31. Each of the layers of the thin metal plate 311 and the thin metal plate 312 may be fixed to both the first holding portion 331a and the second holding portion 331b, for example, by welding. Each of the layers of the thin metal plate 311 and the thin metal plate 312 may be thereby held by the first holding portion 331a and the second holding portion 331b.

The description above refers to an example where the welding of the end of the spiral unit 31 to the holding portion 331 allows the holding portion 331 to hold the end of the spiral unit 31; however, the holding portion 331 may be allowed to hold the end of the spiral unit 31 by any other method. For example, the holding portion 331 may have a slit and the end of the spiral unit 31 may be inserted in the slit to be sandwiched by the holding portion 331. The holding portion 331 may be thereby allowed to hold the end of the spiral unit 31.

In the non-limiting example illustrated in FIGS. 2 and 3, the both ends of the spiral unit 31 in the axial direction may be held by the holding portion 331, more specifically, by the first holding portion 331a and the second holding portion 331b; however, it is sufficient that the holding portion 331 holds the first end, the second end, or both of the spiral unit 31 in the axial direction as described above. Therefore, for example, the first holding portion 331a or the second holding portion 331b may be omitted from the configuration of the holding portion 331. In view of more appropriately holding the spiral unit 31 to keep the spiral unit 31 in the desired shape, however, the holding portion 331 may include the first holding portion 331a and the second holding portion 331b that hold the respective ends of the spiral unit 31 in the axial direction in one example embodiment.

The spiral heat exchanger 30 described above may perform heat exchange between fluids. For example, the spiral heat exchanger 30 in the vehicle 1 may be provided to cool the gas exhausted from the turbine engine 20 by means of heat exchange, as described above. A description is given now below of a behavior of the gas in the spiral heat exchanger 30.

In FIGS. 2 and 3, the thick arrow schematically illustrates the flow of the high-temperature gas sent from the turbine engine 20. As illustrated in FIG. 2, the high-temperature gas that is exhausted from the turbine engine 20 and passes through the exhaust pipe 42 may be first sent to the inner side of the spiral unit 31. In one specific but non-limiting example, the above-described high-temperature gas may be sent to the inner side of the portion corresponding to the innermost layer of the thin metal plates in the spiral unit 31.

Thereafter, as illustrated in FIG. 3, the gas sent to the inner side of the spiral unit 31 may pass through inside of the flow path 52 in the circumferential direction to flow outward. At this time, heat exchange occurs between the gas flowing in the flow path 52 and the coolant flowing in the flow path 51 adjacent to the flow path 52. Heat of the gas is thereby absorbed by the coolant and the gas is therefore cooled. As illustrated in FIGS. 2 and 3, the cooled gas that has passed through the flow path 52 may be sent to the exhaust pipe 42.

A dimension of the spiral unit 31 may greatly influence a heat exchange performance of the spiral heat exchanger 30. Therefore, for example, appropriately setting the width L2 of the flow path 52 in which the gas flows may provide the spiral heat exchanger 30 with a desired heat exchange performance. Accordingly, in a case where the shape of the spiral unit 31 deviates from the desired shape, e.g., a designed shape, a sufficient heat exchange performance may not be provided to the spiral heat exchanger 30 in some cases. For example, it may be difficult to provide the spiral heat exchanger 30 with a sufficient heat exchange performance as a result of that the width L2 of the flow path 52 in which the gas flows is excessively narrowed in a local portion.

As described above, the bracket 33 of the spiral heat exchanger 30 includes the holding portion 331 and the fixed portion 332. The holding portion 331 holds the first end, the second end, or both of the spiral unit 31 in the axial direction of the spiral direction. The fixed portion 332 is disposed between the outer peripheral surface of the spiral unit 31 and the inner peripheral surface of the case member 32 and is fixed to the inner peripheral surface of the case member 32. Therefore, causing the holding portion 331 to hold the first end, the second end, or both of the spiral unit 31 in the axial direction of the spiral unit 31 makes it possible to keep the spiral unit 31 in the desired shape. Further, fixing the fixed portion 332 to the inner peripheral surface of the case member 32 between the outer peripheral surface of the spiral unit 31 and the inner peripheral surface of the case member 32 makes it possible to attach the spiral unit 31 to the case member 32 while efficiently using the space between the outer peripheral surface of the spiral unit 31 and the inner peripheral surface of the case member 32. As a result, it is possible to contain the spiral unit 31 in the case member 32 in a state of being kept in the desired shape while suppressing an increase in size of the spiral heat exchanger 30.

As described above, it is possible to protect, by means of the case member 32, the spiral unit 31 from an impact applied from the outside by containing, in the case member 32, the spiral unit 31 that includes the thin metal plates and is configured to cool the fluid such as the gas exhausted from the turbine engine 20 of the vehicle 1 by means of the coolant. For example, this makes it possible to prevent the spiral unit 31 from being given a damage such as a hole and to thereby suppress leakage of the coolant to outside. It is also possible to appropriately secure the heat exchange performance of the spiral heat exchanger 30 by keeping the spiral unit 31 in the desired shape.

3. Example Effects of Spiral Heat Exchanger

A description is given next of example effects of the spiral heat exchanger 30 according to the example embodiment.

The spiral heat exchanger 30 according to the example embodiment includes the spiral unit 31. The spiral unit 31 includes two or more thin metal plates, e.g., the thin metal plates 311 and 312. The thin metal plates are spaced away from each other and spirally wound. The thin metal plates define two or more flow paths. A portion or all of the flow paths are provided with a coolant flowing in the corresponding portion or all of the flow paths. Accordingly, it is possible to reduce the weight of the vehicle 1 by using the thin metal plates as the metal plates included in the spiral unit 31 that is configured to cool, with the use of the coolant, the fluid such as the exhaust gas from the turbine engine 20 of the vehicle 1. The spiral heat exchanger 30 further includes the case member 32 and the bracket 33. The case member 32 is attached to the vehicle 1 and contains the spiral unit 31. The bracket 33 is fixed to the case member 32 and holds the spiral unit 31. The bracket 33 includes the holding portion 331 and the fixed portion 332. The holding portion 331 holds one or both of the ends of the spiral unit 31 in the axial direction of the spiral unit 31. In other words, the holding portion 331 holds the front end, the rear end, or both of the spiral unit 31. The fixed portion 332 is disposed between the outer peripheral surface of the spiral unit 31 and the inner peripheral surface of the case member 32, and is fixed to the inner peripheral surface of the case member 32. This allows the spiral unit 31 including the thin metal plates to be contained in the case member 32 in a state of being kept in the desired shape, while suppressing an increase in size of the spiral heat exchanger 30. Accordingly, it is possible to reduce the weight of the vehicle 1, protect the spiral unit 31 from an impact applied from the outside by means of the case member 32, and appropriately secure the heat exchange performance of the spiral heat exchanger 30. As described above, according to the spiral heat exchanger 30 of the example embodiment of the technology, it is possible to appropriately attach the spiral heat exchanger 30 to the vehicle 1 while reducing the weight of the vehicle 1.

According to one example embodiment, the holding portion 331 of the bracket 33 of the spiral heat exchanger 30 may include the first holding portion 331a and the second holding portion 331b. The first holding portion 331a may hold one end of the spiral unit 31 in the axial direction. The second holding portion 331b may hold the other end of the spiral unit 31 in the axial direction. In a specific but non-limiting example, the first holding portion 331a may hold the front end of the spiral unit 31 in the axial direction, and the second holding portion 331b may hold the rear end of the spiral unit 31 in the axial direction. This allows each of the front and rear ends of the spiral unit 31 to be held by the holding portion 331. Accordingly, it is possible to suppress deviation of the shape of the spiral unit 31 from the desired shape such as a designed shape in both of the front and rear ends of the spiral unit 31. As a result, it is possible to more appropriately hold the spiral unit 31 to keep the spiral unit 31 in the desired shape.

According to one example embodiment, the fixed portion 332 of the bracket 33 of the spiral heat exchanger 30 may extend in the axial direction from the front end of the spiral unit 31 to the rear end of the spiral unit 31. The first holding portion 331a may extend from a first end, in the axial direction, of the fixed portion 332 toward inner side of the case member 32. The second holding portion 331b may extend from a second end, in the axial direction, of the fixed portion 332 toward the inner side of the case member 32. This allows the first holding portion 331a and the second holding portion 331b that respectively hold the front and rear ends of the spiral unit 31 in the axial direction to be appropriately disposed while disposing the fixed portion 332 between the outer peripheral surface of the spiral unit 31 and the inner peripheral surface of the case member 32. As a result, it is possible to appropriately secure the performance of the bracket 33 of holding the front and rear ends of the spiral unit 31 in the axial direction while suppressing an increase in size of the bracket 33.

According to one example embodiment, the fixed portion 332 of the bracket 33 of the spiral heat exchanger 30 may be spaced away from the outer peripheral surface of the spiral unit 31. This suppresses direct transmission, to the spiral unit 31, of the impact applied to the case member 32 from the outside. The impact applied to the case member 32 from the outside may be, for example, an impact applied by an object such as a stone coming into contact with the case member 32. As a result, it is possible to appropriately protect the spiral unit 31 from the impact applied to the case member 32 from the outside.

According to one example embodiment, the holding portion 331 of the bracket 33 of the spiral heat exchanger 30 may hold each of the layers of the thin metal plate 311 and the thin metal plate 312 of the spiral unit 31. This allows two or more portion at the end of the spiral unit 31 that are spaced away from each other in the radial direction of the spiral unit 31 to be held. As a result, it is possible to more appropriately hold the spiral unit 31 to keep the spiral unit 31 in the desired shape.

According to one example embodiment, the two or more brackets 33 may be spaced away from each other in a circumferential direction of the spiral unit 31 in the spiral heat exchanger 30. This allows the two or more portions at the end of the spiral unit 31 that are spaced away from each other in the circumferential direction of the spiral unit 31 to be held. As a result, it is possible to more appropriately hold the spiral unit 31 to keep the spiral unit 31 in the desired shape.

4. Conclusion

As described above, according to one example embodiment of the technology, the spiral heat exchanger 30 includes the spiral unit 31, the case member 32, and the bracket 33. The spiral unit 31 includes two or more thin metal plates, e.g., the thin metal plates 311 and 312. The thin metal plates are spaced away from each other and spirally wound. The thin metal plates define two or more flow paths. A portion or all of the flow paths are provided with a coolant flowing in the corresponding portion or all of the flow paths. The bracket 33 is fixed to the case member 32 and holds the spiral unit 31. The bracket 33 includes the holding portion 331 and the fixed portion 332. The holding portion 331 holds the first end, the second end, or both of the spiral unit 31 in the axial direction of the spiral unit 31. The fixed portion 332 is disposed between the outer peripheral surface of the spiral unit 31 and the inner peripheral surface of the case member 32. The fixed portion 332 is fixed to the inner peripheral surface of the case member 32. This allows the spiral unit 31 to be contained in the case member 32 in a state of being kept in the desired shape, while suppressing an increase in size of the spiral heat exchanger 30. The spiral unit 31 includes the thin metal plates and is configured to cool, by means of the coolant, the fluid such as the exhaust gas from the turbine engine 20 of the vehicle 1. As a result, it is possible to appropriately attach the spiral heat exchanger 30 to the vehicle 1 while reducing the weight of the vehicle 1.

Although some example embodiments of the technology have been described in the foregoing by way of example with reference to the accompanying drawings, the technology is by no means limited to the example embodiments described above. As it is clear that a person with an ordinary knowledge in the technical filed of the technology can arrive at various modifications and applications within the technical idea described in the appended claims, it should be appreciated that such modifications and applications are clearly encompassed in the technical scope of the technology.

For example, the vehicle 1 has been described above referring to FIG. 1 as an example of the vehicle on which the spiral heat exchanger 30 is to be mounted; however, the configuration of the vehicle on which the spiral heat exchanger of one embodiment of the technology is to be mounted is not particularly limited thereto. For example, the vehicle on which the spiral heat exchanger according to one embodiment of the technology is to be mounted may be a vehicle with a portion of the components of the vehicle 1 omitted, a vehicle with some components added to the components of the vehicle 1, or a vehicle with the altered arrangement of the components of the vehicle 1. Moreover, as described above, the spiral heat exchanger according to one embodiment of the technology may be used to cool any gas other than the exhaust gas from the turbine engine 20. For example, the spiral heat exchanger according to one embodiment of the technology may be coupled to an exhaust pipe in which an exhaust gas from a gasoline engine flows in a vehicle mounted with the gasoline engine.

Moreover, the spiral unit 31 has been described above that includes two thin metal plates and the two thin metal plates define the two flow paths; however, the spiral unit according to one embodiment of the technology may include three or more thin metal plates. In this case, three or more flow paths may be provided in the spiral unit, which allows for heat exchange between three or more fluids.

Moreover, for example, the spiral heat exchanger 30 has been described above referring to FIGS. 2 and 3; however, the example illustrated in FIGS. 2 and 3 are mere example and the shape of each of the components including the spiral unit, the case member, and the bracket of the spiral heat exchanger according to one embodiment of the technology is not particularly limited to that in the example described above.

The invention claimed is:

1. A spiral heat exchanger comprising:
  a spiral unit that includes two or more metal plates, the metal plates being spaced away from each other and spirally wound, the metal plates defining two or more flow paths, a portion or all of the flow paths being provided with a coolant flowing in the corresponding portion or all of the flow paths;
  a case member that is attached to a vehicle and contains the spiral unit; and
  at least one bracket that is fixed to the case member and holds the spiral unit,
  the at least one bracket including
    a holding portion that holds a first end, a second end, or both of the spiral unit in an axial direction of the spiral unit, and
    a fixed portion that is disposed between an outer peripheral surface of the spiral unit and an inner peripheral surface of the case member, the fixed portion being fixed to the inner peripheral surface of the case member, wherein
  the at least one bracket extends in the axial direction from the first end of the spiral unit to the second end of the spiral unit.

2. The spiral heat exchanger according to claim 1, wherein the holding portion includes
  a first portion that holds the first end of the spiral unit, and
  a second portion that holds the second end of the spiral unit.

3. The spiral heat exchanger according to claim 1, wherein the fixed portion is spaced away from the outer peripheral surface of the spiral unit.

4. The spiral heat exchanger according to claim 1, wherein
the metal plates each includes two or more turns by being spirally wound, and
the holding portion holds each of the two or more turns of each of the metal plates of the spiral unit.

5. The spiral heat exchanger according to claim 1, wherein
the at least one bracket comprises two or more brackets, and
the two or more brackets are spaced away from each other in a circumferential direction of the spiral unit.

6. The spiral heat exchanger according to claim 1, wherein
the at least one bracket comprises a single uniform continuous member that holds the first end, the second end, or both of the spiral unit in the axial direction of the spiral unit, and
wherein the metal plates comprise thin metal plates.

7. The spiral heat exchanger according to claim 2, wherein
the fixed portion extends in the axial direction from the first end of the spiral unit to the second end of the spiral unit,
the first portion of the holding portion extends from a first end, in the axial direction, of the fixed portion toward an inner side of the case member, and
the second portion of the holding portion extends from a second end, in the axial direction, of the fixed portion toward the inner side of the case member.

8. The spiral heat exchanger according to claim 2, wherein the fixed portion is spaced away from the outer peripheral surface of the spiral unit.

9. The spiral heat exchanger according to claim 2, wherein
the metal plates each includes two or more turns by being spirally wound, and
the holding portion holds each of the two or more turns of each of the metal plates of the spiral unit.

10. The spiral heat exchanger according to claim 2, wherein
the at least one bracket comprises two or more brackets, and
the two or more brackets are spaced away from each other in a circumferential direction of the spiral unit.

11. The spiral heat exchanger according to claim 3, wherein
the metal plates each includes two or more turns by being spirally wound, and
the holding portion holds each of the two or more turns of each of the metal plates of the spiral unit.

12. The spiral heat exchanger according to claim 3, wherein
the at least one bracket comprises two or more brackets, and
the two or more brackets are spaced away from each other in a circumferential direction of the spiral unit.

13. The spiral heat exchanger according to claim 7, wherein the fixed portion is spaced away from the outer peripheral surface of the spiral unit.

14. The spiral heat exchanger according to claim 7, wherein
the metal plates each includes two or more turns by being spirally wound, and
the holding portion holds each of the two or more turns of each of the metal plates of the spiral unit.

15. The spiral heat exchanger according to claim 7, wherein
the at least one bracket comprises two or more brackets, and
the two or more brackets are spaced away from each other in a circumferential direction of the spiral unit.

16. The spiral heat exchanger according to claim 13, wherein
the metal plates each includes two or more turns by being spirally wound, and
the holding portion holds each of the two or more turns of each of the metal plates of the spiral unit.

17. The spiral heat exchanger according to claim 13, wherein
the at least one bracket comprises two or more brackets, and
the two or more brackets are spaced away from each other in a circumferential direction of the spiral unit.

18. The spiral heat exchanger according to claim 8, wherein
the metal plates each includes two or more turns by being spirally wound, and
the holding portion holds each of the two or more turns of each of the metal plates of the spiral unit.

19. The spiral heat exchanger according to claim 8, wherein
the at least one bracket comprises two or more brackets, and
the two or more brackets are spaced away from each other in a circumferential direction of the spiral unit.

20. A spiral heat exchanger comprising:
a spiral unit that includes two or more metal plates, the metal plates being spaced away from each other and spirally wound, the metal plates defining two or more flow paths, a portion or all of the flow paths being provided with a coolant flowing in the corresponding portion or all of the flow paths;
a case member that is attached to a vehicle and contains the spiral unit; and
at least one bracket that is fixed to the case member and holds the spiral unit,
the at least one bracket including
a holding portion that holds the spiral unit in an axial direction of the spiral unit, and
a fixed portion that is disposed between an outer peripheral surface of the spiral unit and an inner peripheral surface of the case member; the fixed portion being fixed to the inner peripheral surface of the case member,
wherein the holding portion includes
a first portion that holds a first end of the spiral unit, and
a second portion that holds a second end of the spiral unit,
wherein the fixed portion extends in the axial direction from the first end of the spiral unit to the second end of the spiral unit,
wherein the first portion of the holding portion extends from a first end, in the axial direction of the fixed portion toward an inner side of the case member, and
the second portion of the holding portion extends from a second end, in the axial direction, of the fixed portion toward the inner side of the case member.

* * * * *